United States Patent
Holman et al.

(10) Patent No.: US 11,630,670 B2
(45) Date of Patent: Apr. 18, 2023

(54) MULTI-TABLE SIGNATURE PREFETCH

(71) Applicant: Apple Inc., Cupertino, CA (US)

(72) Inventors: Douglas C. Holman, San Francisco, CA (US); Ian D. Kountanis, Santa Clara, CA (US); Amit Kumar, Lake Oswego, OR (US); Muawya M. Al-Otoom, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/382,123

(22) Filed: Jul. 21, 2021

(65) Prior Publication Data

US 2023/0023860 A1 Jan. 26, 2023

(51) Int. Cl.
*G06F 9/38* (2018.01)

(52) U.S. Cl.
CPC .................. *G06F 9/3804* (2013.01)

(58) Field of Classification Search
CPC .... G06F 9/3802; G06F 9/3804; G06F 9/3806; G06F 9/3808; G06F 9/3844; G06F 9/3848
See application file for complete search history.

(56) References Cited

U.S. PATENT DOCUMENTS

| | | | |
|---|---|---|---|
| 6,560,693 B1 | 5/2003 | Puzak et al. | |
| 6,823,446 B1 * | 11/2004 | Sinharoy | G06F 9/3848 712/239 |
| 7,487,296 B1 | 2/2009 | Iacobovici et al. | |
| 7,526,607 B1 | 4/2009 | Singh et al. | |
| 7,774,578 B2 | 8/2010 | Keltcher | |
| 8,181,005 B2 | 5/2012 | Zuraski, Jr. et al. | |
| 8,533,422 B2 | 9/2013 | Subramaniam et al. | |
| 9,058,277 B2 | 6/2015 | Bade et al. | |
| 9,098,418 B2 | 8/2015 | Kannan et al. | |
| 9,262,327 B2 | 2/2016 | Steely, Jr. et al. | |
| 9,582,282 B2 | 2/2017 | Hayenga et al. | |
| 9,665,491 B2 | 5/2017 | Radhakrishnan et al. | |
| 10,209,992 B2 | 2/2019 | Wilson et al. | |
| 10,209,993 B2 | 2/2019 | Wang et al. | |
| 10,417,130 B2 | 9/2019 | Brekelbaum et al. | |

(Continued)

FOREIGN PATENT DOCUMENTS

WO 2019224518 11/2019

*Primary Examiner* — Keith E Vicary
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to signature-based instruction prefetching. In some embodiments, processor pipeline circuitry executes a computer program that includes control transfer instructions, such that the execution follows a taken path through the computer program. First signature prefetch table circuitry indicates prefetch addresses for signatures generated using a first signature generation technique and second signature prefetch table circuitry indicates prefetch addresses for signatures generated using a second, different signature generation technique. Signature prefetch circuitry, in response to a prefetch training event, determines a first signature according to the first technique and a second signature according to the second technique and selects one but not both of the first and second signature prefetch tables to train using the first signature or the second signature.

20 Claims, 9 Drawing Sheets

(56) References Cited

U.S. PATENT DOCUMENTS

| | | | |
|---|---|---|---|
| 10,642,618 B1 | 5/2020 | Hakewill et al. | |
| 10,691,460 B2 | 6/2020 | Bonanno et al. | |
| 10,713,053 B2 | 7/2020 | Bera et al. | |
| 10,754,650 B2 | 8/2020 | DeHon | |
| 10,884,934 B1 | 1/2021 | Yochai | |
| 2005/0149707 A1* | 7/2005 | Jourdan | G06F 9/3848 712/239 |
| 2014/0143522 A1 | 5/2014 | Saidi et al. | |
| 2014/0325239 A1 | 10/2014 | Ghose | |
| 2014/0344558 A1* | 11/2014 | Holman | G06F 9/382 712/239 |
| 2015/0106590 A1* | 4/2015 | Chou | G06F 11/3037 712/207 |
| 2016/0034023 A1 | 2/2016 | Arora et al. | |
| 2016/0306632 A1* | 10/2016 | Bouzguarrou | G06F 9/3848 |
| 2017/0286116 A1* | 10/2017 | Johar | G06F 9/3806 |
| 2017/0286119 A1 | 10/2017 | Al Sheikh et al. | |
| 2019/0004802 A1* | 1/2019 | Tarsa | G06F 9/3848 |
| 2019/0213011 A1* | 7/2019 | Bhat | G06F 9/3806 |
| 2019/0361707 A1* | 11/2019 | Vougioukas | G06F 9/3861 |
| 2020/0050459 A1 | 2/2020 | Palivela et al. | |
| 2020/0401409 A1* | 12/2020 | Dundas | H04L 9/0643 |

* cited by examiner

MULTI-TABLE SIGNATURE PREFETCH

BACKGROUND

Technical Field

This disclosure relates generally to computer processors and more particularly to prefetching.

Description of the Related Art

Computer processors fetch and execute program instructions, which may include control transfer instructions such as branches, jumps, and function calls and returns. Thus, execution may follow a taken path through the program, typically moving linearly through the program other than potential redirections based on control transfer instructions.

Processors typically include instruction caches configured to store portions of the program being executed for faster access relative to a backing memory. Cache misses may reduce performance because the processor may pause execution until the instructions to be executed are retrieved from the backing memory. Therefore, processors may predict which instructions will be needed and prefetch those instructions into the instruction cache before it is known definitively whether the instructions will be executed.

Signature prefetchers operate using a signature generated based on the taken path through the program. For example, U.S. patent application Ser. No. 15/171,316 filed Jun. 2, 2016 and titled "Callgraph Signature Prefetch" discusses example prefetching using a signature table that maps execution signatures to prefetch addresses. As one example, the current signature may be updated each time there is a new call or return address by XORing the address with the previous signature. The processor may train the prefetcher by allocating or updating signature table entries such that a new signature (based on current execution) triggers a prefetch of the corresponding address when it matches a previous signature in the signature table.

DETAILED DESCRIPTION

In example embodiments discussed below, a processor trains multiple independent signature prefetch tables that use signatures generated using different techniques. In some embodiments, the processor trains at most one of the multiple tables for a given training event (such as an instruction cache miss) and may trigger a prefetch when there is a signature hit in any table. The different types of signatures for different tables may be generated by sampling at different types of control transfer instructions, by considering different amounts of execution history, by using different prefetch lead times, etc., or some combination thereof.

Training circuitry, for a given training event, may attempt to train one of the tables first, but switch to training another table if the first table was already trained for its current signature and failed to cover the miss. Speaking generally, one of the tables may provide more accurate predictions while another table may train more quickly and may collapse multiple paths with the same target address into a single entry.

In various embodiments, disclosed techniques may advantageously improve prefetch performance relative to traditional techniques, reduce prefetch table circuit area, or both.

Overview of Signature Prefetch Circuitry with Multiple Tables

Figure 1:
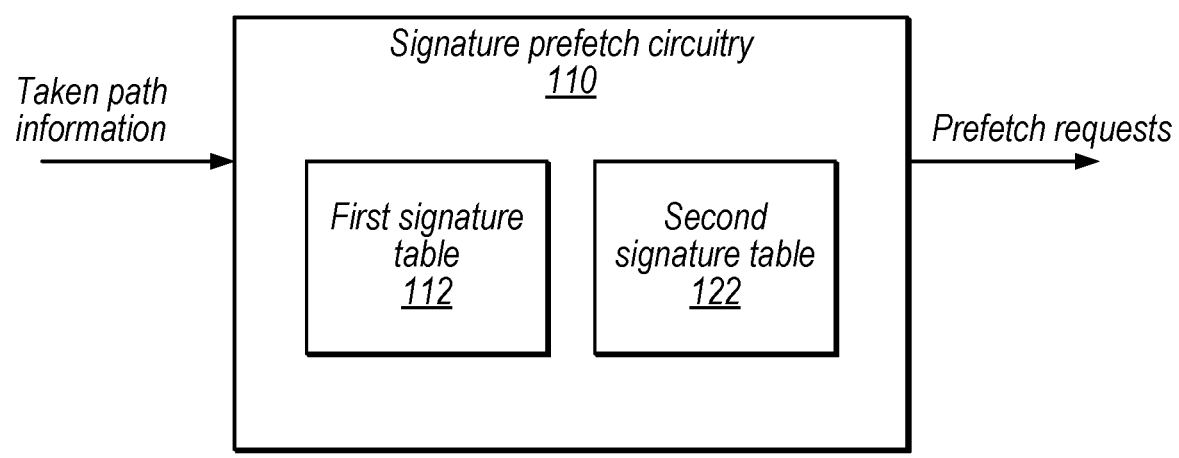
FIG. 1 is a block diagram illustrating example signature prefetch circuitry with multiple signature tables, according to some embodiments.

FIG. 1 is a block diagram illustrating example signature prefetch circuitry that implements multiple tables, according to some embodiments. In the illustrated embodiment, signature prefetch circuitry 110 receives taken path information based on execution of program instructions, trains first signature table 112 and second signature table 122, and issues prefetch requests based on hits in those tables.

Signature prefetch circuitry 110 may maintain different current signature values for the two different tables and may update the current signature values at different times (e.g., when the different signatures are sampled at different types of control transfer instructions).

As discussed above, the different tables may use signatures that are generated based on different types of control transfer instructions. For example, the first signature table 112 may use signature type A which is updated at taken branches while the second signature table 122 may use signature type B which is updated at function calls and returns.

Further, the different tables may use signatures generated based on different history lengths. For example, the length may range from a single address (e.g., the target of a single control transfer instruction) to the entire available execution history, sampled at certain points. As used herein, the term "signature" refers to information that is generated based on locations of instructions in the taken execution path (e.g., based on addresses of one or more instructions in the taken path). The term "signature" encompasses a single address from the taken path as well as values generated by one or more operations that use multiple addresses in the taken path as inputs. In some embodiments, circuitry generates a type of signature based on a fixed number of prior addresses (e.g., targets of one or more types of control transfer instructions). Note that a given signature value may correspond to multiple taken paths for a given type of signature (while another signature generation technique may allow distinguishing between the multiple taken paths in a particular scenario).

The signatures for the different tables may be generated using different mathematical operations or algorithms. For example, XOR circuitry may produce a new signature based on the current address and the previous signature for one type of signature, while other circuitry may implement other mathematical operations to generate another type of signature.

Finally, the signature types for the different tables may be associated with different prefetch lead times. Lead time refers to how far ahead in the instruction stream prefetching is attempted (e.g., the distance in the instruction stream between instructions that generated the signature and instructions pre-fetched based on the signature).

Detailed example training techniques are discussed in detail below, but generally training circuitry may check if there is a tag hit for the first table (or a threshold number of tag hits) and move to training the second table instead if so, because the first table was not able to cover a miss. The reasoning may be that a hit (or threshold number of hits) in the first table is an indication that its training signature has too many different addresses that want to prefetch based on that signature, which caused a failure to prefetch properly and resulted in the training event. Therefore, a table with more (or different) history may be used to differentiate among the paths to the different addresses. Training of one or both tables may also be suppressed in certain situations, e.g., based on whether the new signature matches the immediately-previous signature for a given table and whether the prefetch address (e.g., a virtual address) is in range of the immediately-previous training address (or in range of a training address within a threshold number of immediately-preceding training addresses).

Disclosed techniques may advantageously increase prefetch efficiency, coverage, and storage utilization. In particular, disclosed techniques may improve prefetch coverage and accuracy and improve performance by reducing failures to cover cache misses in the context of a given circuit area used for signature prefetch table(s). Further, disclosed techniques may provide flexibility to use a mix of signature generation techniques to better predict prefetch targets.

For a given program or portion of a program, flow typically proceeds in a sequential fashion. Consider the following group of instructions: ld mem1→r1; add r1, r2→r3; st r3→mem2. In this exemplary sequence, execution and completion proceeds sequentially from the load instruction to the add instruction to the store instruction. This sequential ordering can be considered the program flow default. In this example, none of these instructions affects the selection of the next instruction to be executed and completed (beyond the default behavior).

In contrast, the execution and completion of instructions with certain opcodes potentially affects the selection of the next instruction to be executed and completed. These instructions are referred to herein as "control transfer instructions." Control transfer instructions may include, without limitation, branches, jumps, calls, returns, etc. Instructions of these types can cause a change in the default behavior of the next instruction to be executed and completed. Control transfer instructions may be used, for example, to execute a loop of instructions.

There may also be many different types of control transfer instructions. For example, control transfer instructions may operate conditionally (i.e., setting the program counter based on whether some condition is true or false) or unconditionally. Similarly, certain control transfer instructions may specify direct target addresses; other control transfer instructions may specify indirect target addresses. Note that the execution and completion of control transfer instructions may have effects on processor state other than on the location of the next instruction (e.g., there might be an instruction that branches after performing an arithmetic operation).

Figure 2:
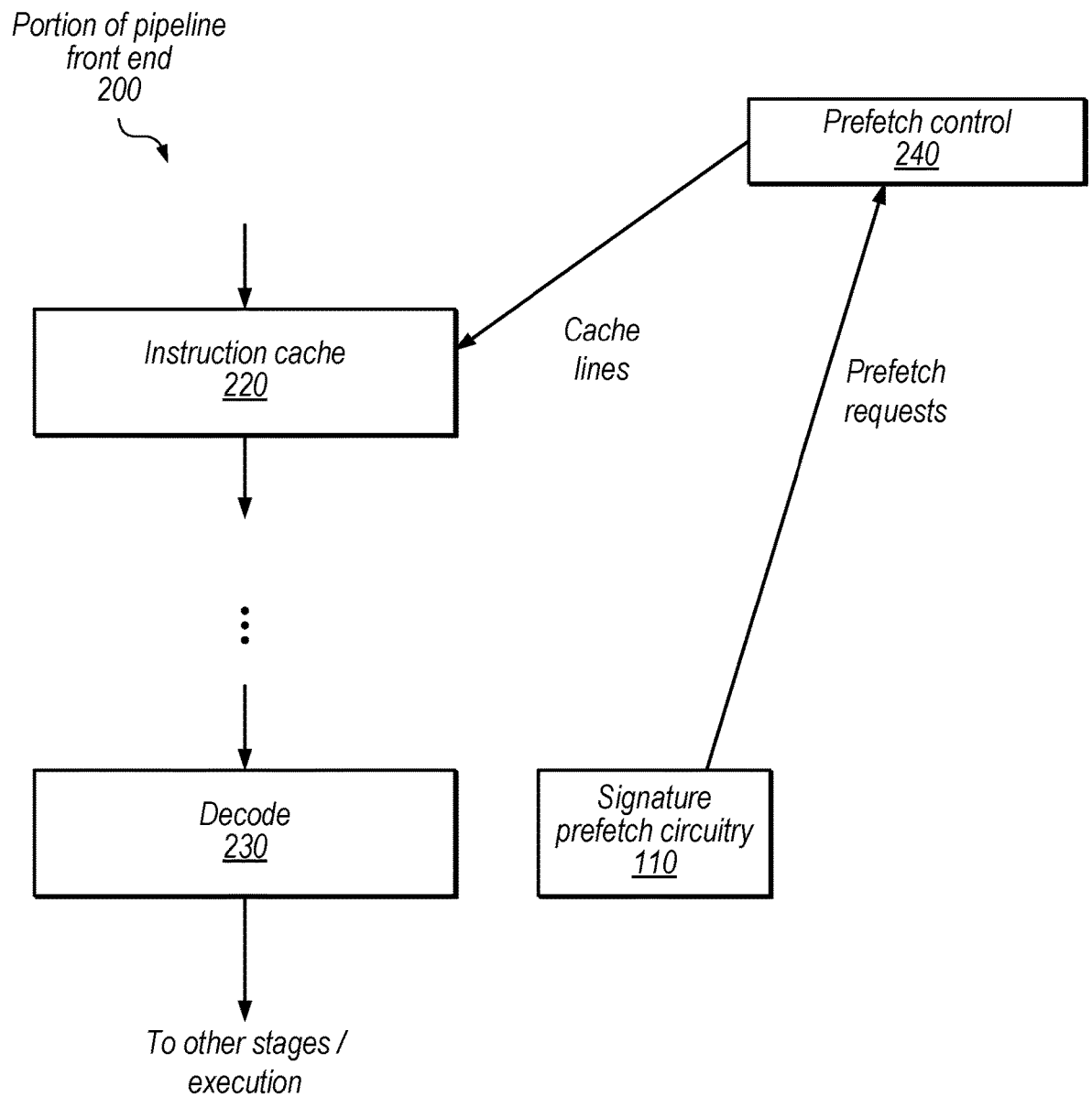
FIG. 2 is a block diagram illustrating an example pipeline front-end that includes signature prefetch circuitry, according to some embodiments.

FIG. 2 is a block diagram illustrating an example portion of a pipeline front end 200 that includes signature pre-fetch circuitry, according to some embodiments. In the illustrated example, the pipeline includes a stage to read instruction cache 220 and a decode stage 230. The processor also includes signature prefetch circuitry 110 configured to generate prefetch requests at the decode stage and prefetch control circuitry 240 configured to provide prefetched cache lines to instruction cache 220.

Speaking generally, signature prefetch circuitry 110 may initiate signature-based prefetches based on decoded instructions in an attempt to reduce or avoid misses in instruction cache 220. This may reduce stalling and improve processor performance.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

In some embodiments, signature prefetch circuitry may fetch other data in addition to or in place of actual instructions. As one example, FIG. 5, discussed in detail below, includes signature next fetch prefetch circuitry configured to prefetch control transfer targets for a next fetch predictor.

In some embodiments, prefetch control circuitry 240 is configured to insert prefetched data requested by signature prefetch circuitry 110 using a different replacement or retention policy value, relative to data inserted by one or more other prefetch units. For example, the device may use a default value that falls between a least-recently used (LRU) value and a most-recently-used (MRU) value in a replacement scheme, when inserting prefetched data into instruction cache 220. The device may adjust replacement values of other entries in cache 220 each time an entry is accessed. For an N-way cache, for example, the replacement value may range from 0 to N−1 where 0 means least-recently-used and a value of N−1 means most-recently-used. In some embodiments, prefetched data is inserted by default at a replacement value Q between 0 and N−1. In some embodiments, prefetched data requested by signature prefetch circuitry 110 is inserted using a replacement value that is greater than the default value (e.g., a value closer to the MRU value than the default value, such as Q+1, Q+2, N−1, etc.), which may increase retention of this data in the cache 220.

Example Signature Table and Training Embodiments

Figure 3:
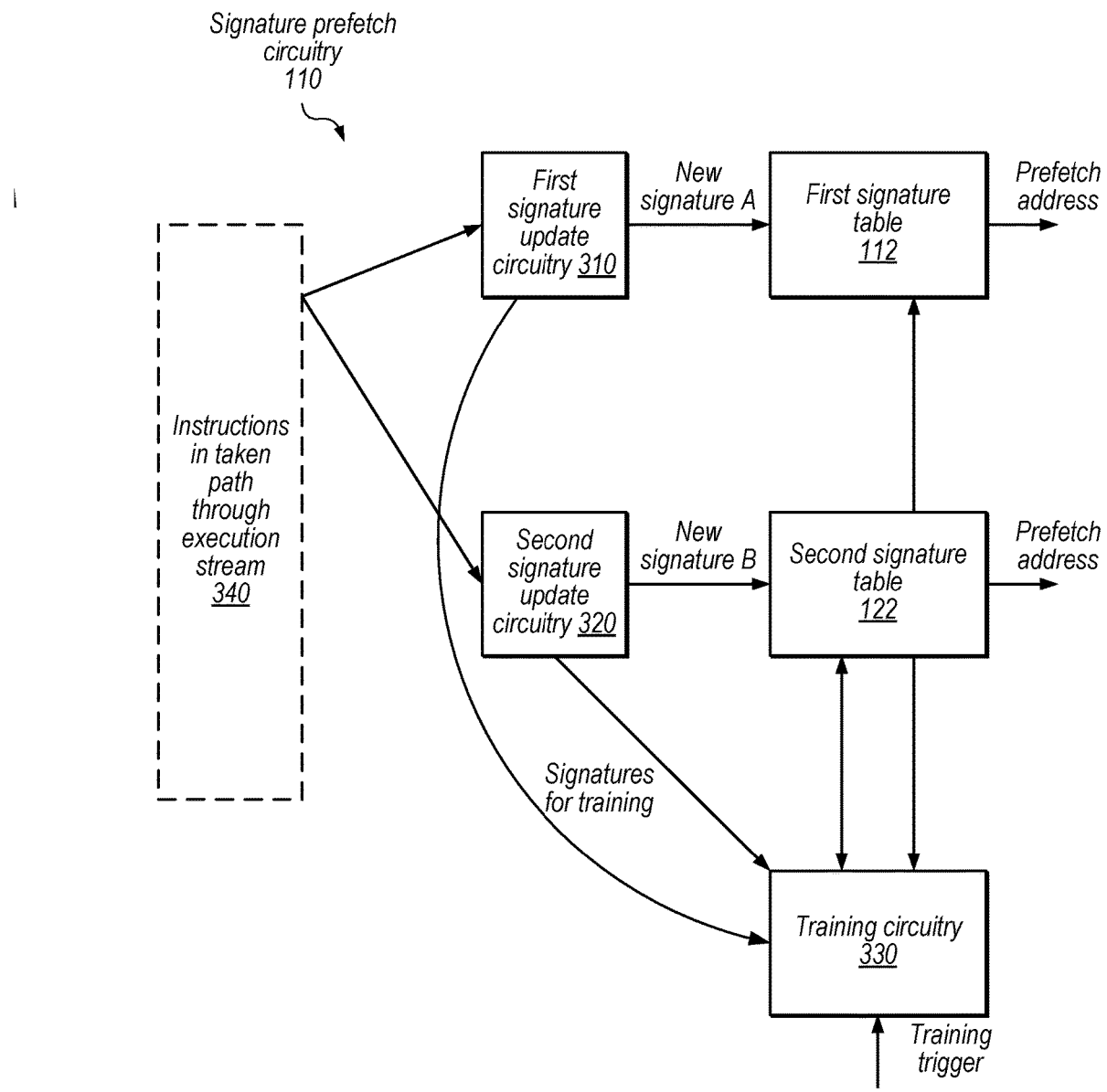
FIG. 3 is a block diagram illustrating example training circuitry for multiple signature prefetch tables, according to some embodiments.

FIG. 3 is a block diagram illustrating a more detailed example of signature prefetch circuitry 110, according to some embodiments. In the illustrated embodiment, signature prefetch circuitry 110 includes first signature update circuitry 310, second signature update circuitry 320, training circuitry 330, and signature prefetch tables 112 and 122.

First and second signature update circuitry 310 and 320, in the illustrated embodiment, are configured to generate signatures for the respective tables 112 and 122 using different techniques. Signature update circuitry 310 and 320 receive information associated with instructions in the taken path 340 through the execution stream. As discussed above, a given instruction in the stream may cause updates to one or both of signatures A and B. In some embodiments, signature prefetch circuitry 110 is configured to initiate a prefetch in response to a new signature hitting in one or both signature tables (or any signature table, in embodiments with more than two tables).

Training circuitry 330, in the illustrated embodiment, is configured to train one or both tables in response to a training trigger. In some embodiments, training circuitry 330 is configured to train at most one table for a given training event. An example of a training trigger is an instruction cache miss. Generally, training events may correspond to cache misses, mispredictions, failures to predict, etc. Example training techniques are discussed in detail below with reference to FIG. 4.

In some embodiments, tables 112 and 122 are set associative, with part of the signature acting as an index and part acting as a tag to determine hits and misses in the tables. In other embodiments, the tables may utilize other associativity topologies. The tables may use the same signature format or different signature formats and may be organized according to the same associativity topology or different associativity topologies. Each table entry may include information for multiple addresses (e.g., for consecutive locations). For example, each table entry may include a counter for each of multiple corresponding addresses and may increment the corresponding counter to train an entry. A given address may be described as in range of an entry when the entry includes information for that address.

Figure 4:
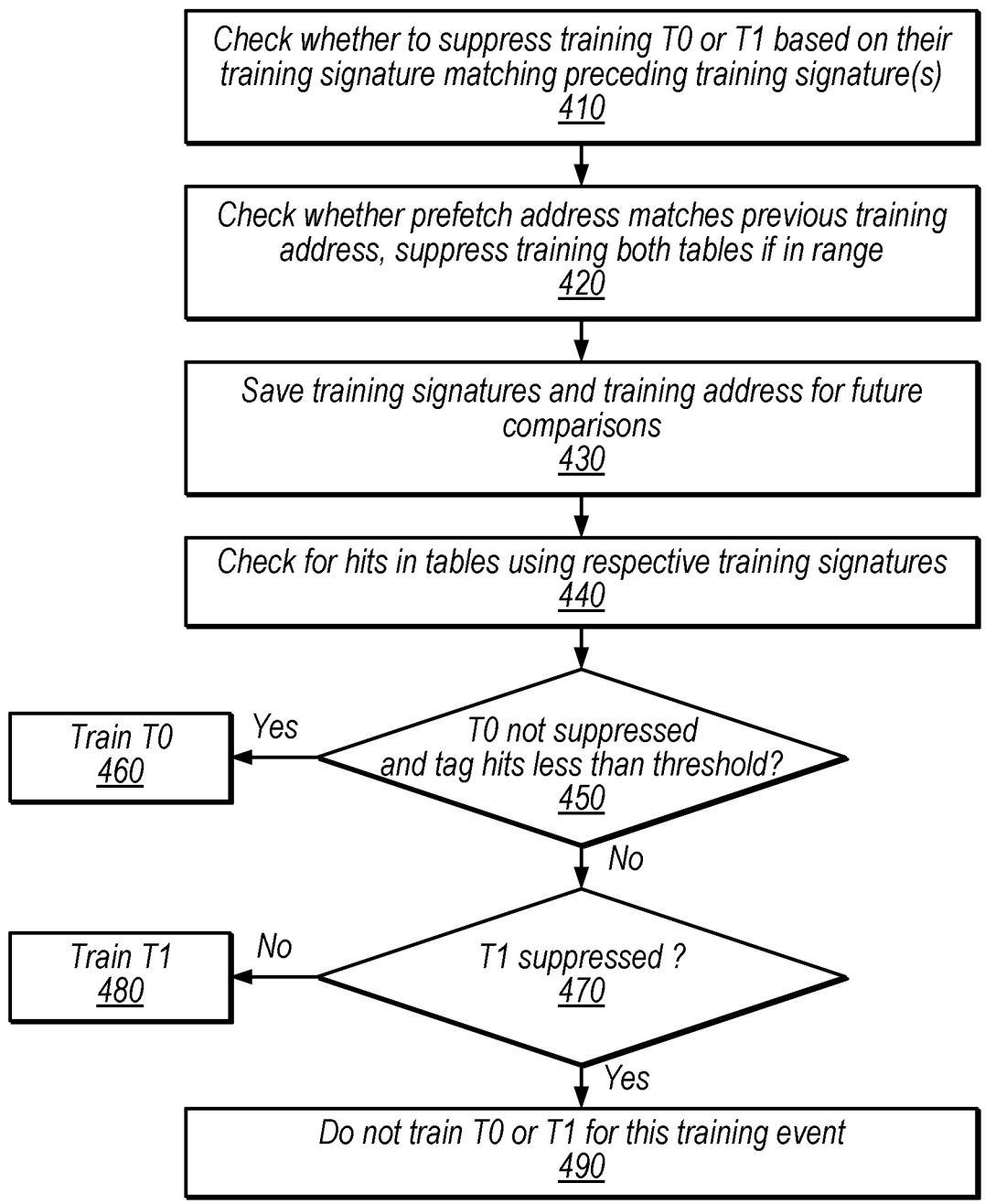
FIG. 4 is a flow diagram illustrating a detailed example training method, according to some embodiments.

FIG. 4 is a flow diagram illustrating an example technique for selecting a table to train from among multiple signature tables, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

The method of FIG. 4 may be performed by training circuitry 330 in response to a training trigger. In the illustrated method, two tables (T0 and T1) that use different signature generation techniques are discussed, but the disclosed techniques may be applied to various numbers of tables. In various embodiments, the tables may be organized hierarchically for training, with a default table being trained first and training being applied to progressively higher levels under certain circumstances, e.g., if circuitry determines that lower levels failed to cover a cache miss.

At 410, training circuitry 330 checks whether to suppress training of tables T0 or T1 based on their training signature matching one or more preceding training signatures. For example, if the training signature for T0 matches the immediately-preceding training signature, training circuitry 330 may suppress training of T0. In these embodiments, training circuitry 330 may include registers configured to store the N most-recent training signatures for a given table and check for matches among these recent signatures. This may avoid back-to-back training using the same signature, for example. Note that the tables may have different thresholds for matching numbers of training signatures M among the N most-recent signatures. As one example, table 1 may be suppressed if two consecutive preceding training signatures match while table 0 may be suppressed if a single preceding training signature matches.

At 420, training circuitry 330 checks whether the prefetch addresses for the training event (e.g., a virtual address that missed in the instruction cache) matches the address used for the previous training iteration. If it matches to within a threshold range (e.g., the range of addresses covered in a table entry or the size of a cache line), circuitry 330 suppresses training of both tables. Note that element 420 may be omitted in some embodiments.

At 430, training circuitry 330 saves the training signatures from the current training iteration (e.g., for comparison at elements 410 and 420 of subsequent iterations).

At 440, training circuitry 330 checks for hits in both tables using the respective training signatures. At 450, if T0 was not suppressed in preceding elements and the number of tag hits in T0 is less than a threshold, flow proceeds to 460 and training circuitry 330 trains T0 (e.g., by allocating a new entry for the training address or updating an existing entry). In some embodiments, the threshold is one, e.g., such that any tag hit in T0 prevents training T0. A hit may indicate that T0 failed to cover a cache miss based on prior training. If T0 was suppressed or the number of tag hits meets the threshold, flow proceeds to 470.

At 470, training circuitry 330 checks whether T1 was suppressed. If not, flow proceeds to 480 and training circuitry 330 trains T1. If T1 was suppressed, flow proceeds to 490 and training circuitry 330 does not train either T0 or T1 for this training event. Note that similar techniques may be applied in a layered fashion to any of various appropriate numbers of tables. In these embodiments, earlier levels may typically provide faster training, collapse multiple paths into a single entry, or both, while later levels may typically provide more accurate results with potentially longer training times.

Example Processor with Multiple Signature Prefetcher Types

Figure 5:
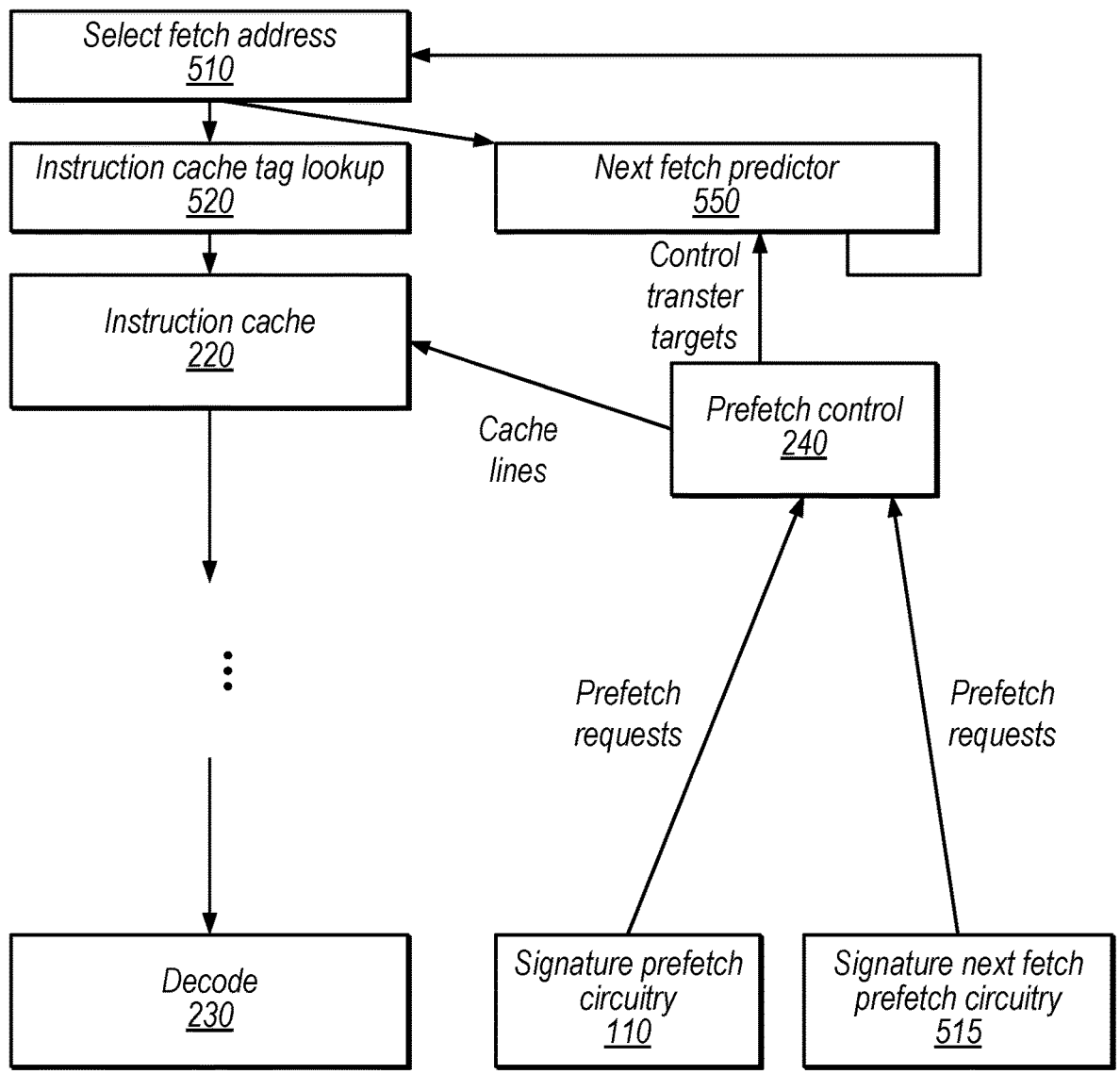
FIG. 5 is a block diagram illustrating an example processor that includes multiple signature prefetch circuits that prefetch different types of data, according to some embodiments.

FIG. 5 is a block diagram illustrating an example processor with multiple types of signature prefetch circuitry, according to some embodiments. In the illustrated embodiment, the processor includes signature prefetch circuitry 110, signature next fetch prefetch circuitry 515, select fetch address circuitry 510, instruction cache tag lookup circuitry 520, instruction cache 220, decode circuitry 230, prefetch control 240, and next fetch predictor 550. Elements 110, 220, 230, and 240 may operate as described above.

Select fetch address circuitry 510 may select a next fetch address from multiple sources (e.g., the next PC in program order, a prediction from next fetch predictor 550, a prediction from another branch predictor, etc.). Instruction cache tag lookup circuitry 520 is configured to check whether the fetch address resides in instruction cache 220.

Next fetch predictor 550, in some embodiments, is configured to predict the fetch address for the next instruction. Next fetch predictor 550 may also include one or more tables. The table entries in next fetch predictor 550 may store a fetch address, branch history data, a next fetch address, an indication of a fetch width, and so on. In some embodiments, next fetch predictor 550 has less logic and less storage area in data structures, such as the one or more tables, than another branch predictor included in the device (but not explicitly shown), but may provide more rapid predictions. Next fetch predictor 550 is typically trained by another branch predictor providing predictions for the branch direction and the branch target address. The other branch predictor may have significantly more time and information to perform these predictions at a later pipeline stage. In order to provide relatively fast next fetch predictions, next fetch predictor 550 may have relatively limited storage area and simpler logic compared with the branch predictor. Due to relatively limited storage area in next fetch predictor 550, program flow information for control transfer instructions that have not been recently executed are unlikely to be present in next fetch predictor 550. Control transfer targets provided by signature next fetch prefetch circuitry 515 (discussed in detail below) may facilitate correct next fetch predictions when the current fetch address is a control transfer instruction.

Signature next fetch prefetch circuitry 515, in some embodiments, is configured to prefetch control transfer targets (e.g., branch targets) for use by next fetch predictor 550. In some embodiments, next fetch prefetch circuitry 515 is configured with multiple tables and configured to implement various training techniques discussed above with reference to circuitry 110. For example, entries in tables of circuitry 515 may include a signature field and a field for a branch target address associated with the signature. Similarly to circuitry 110, different tables of circuitry 515 may be trained using different signature generation techniques using different amounts of history, sampling on different types of control transfer instructions, using different prefetch lead times, etc., or any combination thereof.

Prefetch control circuitry 240 is configured to prefetch cache lines based on predictions from signature prefetch circuitry 110 and configured to fetch control transfer targets based on predictions from signature next fetch prefetch circuitry 515.

In some embodiments, circuitry 515 includes training circuitry configured to train similarly to the method of FIG. 4. In some embodiments that include both circuitry 110 and 515, the training technique is slightly different for the different types of signature prefetch circuitry. For example, training of circuitry 515 may omit element 420 of FIG. 4, element 410 may use different numbers of matches to determine whether to suppress tables, and element 450 may use a different threshold for T0 of circuitry 515 (e.g., a threshold of two tag hits). Further, if a merge candidate exists in T0 (a tag hit that also matches the fetch address with the training target address), circuitry 515 may merge the training into that candidate even if the threshold is met.

In some embodiments, circuitry 515 is configured to initiate training based on a misprediction by next fetch predictor 550 (in contrast to signature prefetch circuitry 100 which may initiate training based on a cache miss, as discussed above).

In some embodiments, a device includes signature-based next-fetch prefetch circuitry such as 515 and does not include signature prefetch circuitry 110. Speaking generally, a given device may include one or multiple types of signature prefetchers, one or more of which may implement the multi-table techniques described herein.

Example Method

Figure 6:
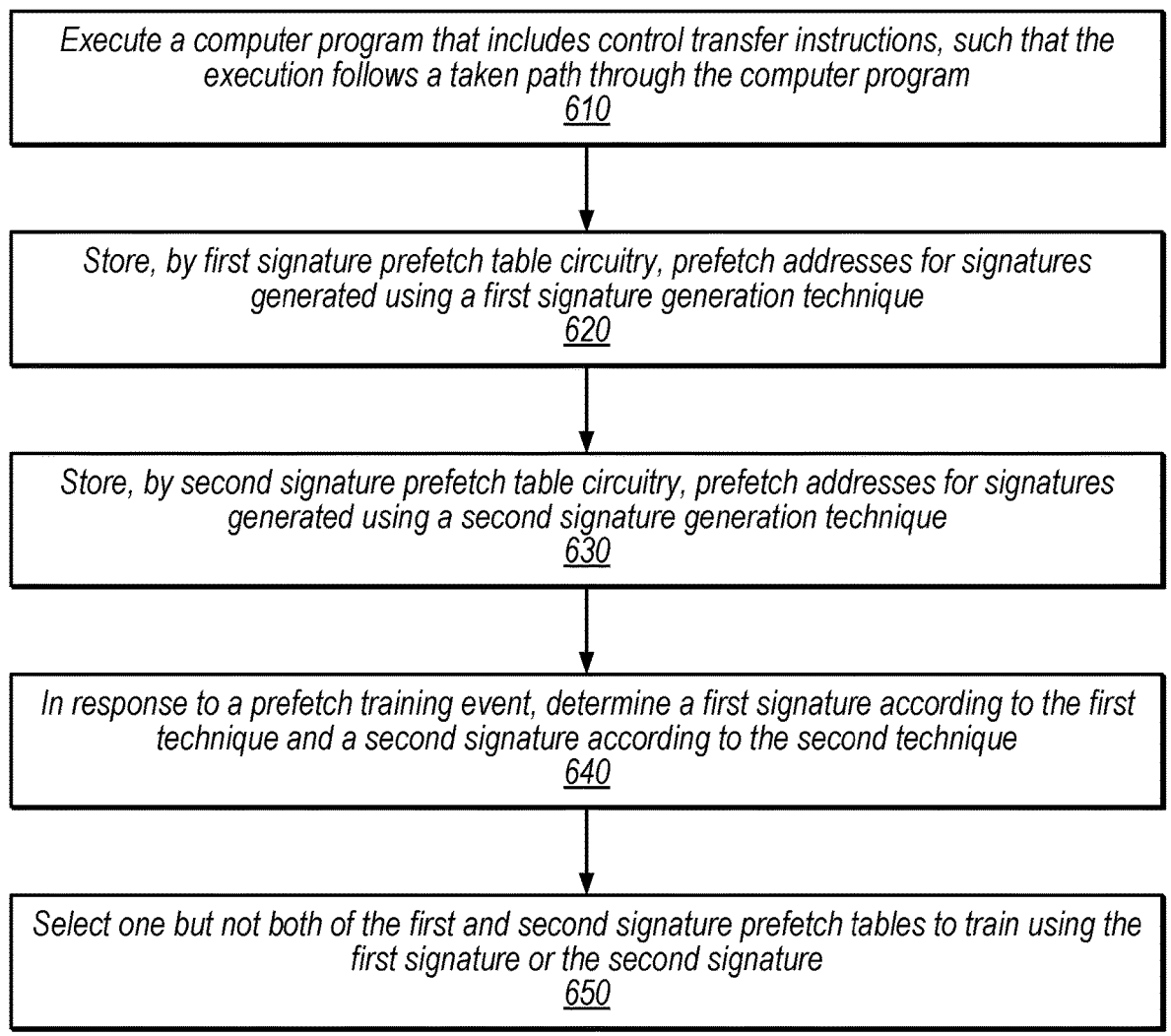
FIG. 6 is a flow diagram illustrating an example method, according to some embodiments.

FIG. 6 is a flow diagram illustrating an example method for operating a signature prefetcher with multiple tables, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, processor circuitry executes a computer program that includes control transfer instructions, such that the execution follows a taken path through the computer program.

At 620, in the illustrated embodiment, first signature prefetch table circuitry stores prefetch addresses for signatures generated using a first signature generation technique.

At 630, in the illustrated embodiment, second signature prefetch table circuitry stores prefetch addresses for signatures generated using a second signature generation technique. In some embodiments, the first technique uses a type of control transfer instruction that specifies a different control transfer operation than any type of control transfer instruction used by the second signature generation technique. In some embodiments, the first and second signature generation techniques implement different prefetch lead times. In some embodiments, the first and second signature generation techniques use different lengths of taken path history.

In some embodiments, the signature prefetch circuitry is configured to generate current signatures during execution using the first and second signature generation techniques and is configured to prefetch data in response to a determination that a current signature matches an entry in one or both of the first signature prefetch table and the second signature prefetch table (e.g., where such entries were allocated based on prior training). In some embodiments, the prefetched data is a target address, e.g., as indicated by signature next fetch prefetch circuitry 515. In some embodiments, the prefetched data is an instruction cache line, e.g., as indicated by signature prefetch circuitry 110.

In some embodiments the first signature prefetch table is a default table for training (e.g., T0 in the embodiment of FIG. 4) and the signature prefetch circuitry is configured to select the second signature prefetch table for training based on a determination that the first signature prefetch table already has an entry (or a threshold number of entries) that matches the first signature.

In some embodiments, the first signature generation technique generates signatures based on program counters of taken branches and the second signature generation technique generates signatures based on call and return control transfer instructions. In these embodiments, the first signature generation technique may use a shorter execution history than the second (e.g., using a single branch target address as a signature, while the second signature generation technique may XOR multiple addresses sampled at call and return instructions). Generally, any of various types of control transfer instructions may be considered by the first and second signature generation techniques in various embodiments, including embodiments with no overlap between the types of control transfer instructions considered between two tables, embodiments with partial overlap, and embodiments with complete overlap.

At 640, in the illustrated embodiment, prefetch circuitry determines a first signature, in response to a prefetch training event, according to the first technique and a second signature according to the second technique. In some embodiments the prefetch training event is a cache miss.

At 650, in the illustrated embodiment, prefetch circuitry selects one but not both of the first and second signature prefetch tables to train using the first signature or the second signature. The training may include allocating an entry with an address associated with the prefetch training event and the corresponding signature for the selected table. Generally, in some embodiments the prefetch circuitry may select one or more, but not all, of multiple tables that use different signature generation techniques for training, in some embodiments. In other embodiments, the prefetch circuitry may select at most one table for training from among multiple tables that use different signature generation techniques.

In some embodiments, the prefetch circuitry is configured to suppress training of both the first and second tables in response to a determination that an address associated with the prefetch training event is within a threshold range of a previous training address. In some embodiments, the prefetch circuitry is configured to suppress training of the first table in response to a determination that the first signature matches a threshold number of preceding training signatures generated using the first technique. In some embodiments, the prefetch circuitry is configured to suppress training of the second table in response to a determination that the second signature matches a threshold number of preceding training signatures generated using the second technique. In some embodiments, the prefetch circuitry is configured to select the first table in response to a determination that it is not suppressed and that the first signature does not match a threshold number of entries in the first table. In some embodiments, the prefetch circuitry is configured to select the second table in response to a determination that the first table is not selected and the second table is not suppressed.

In some embodiments, in response to detecting a merge candidate entry in the first table that matches the first signature and matches an address associated with the prefetch training event, the signature prefetch circuitry is configured to modify the merge candidate entry based on the prefetch training event.

In some embodiments, control circuitry is configured to use a different replacement policy value for insertion of data into a cache that was prefetched by the signature prefetch circuitry than for insertion of other data into the cache. For example, the control circuitry may insert a value greater than a default LRU value to increase retention of the inserted entry.

Example Device

Figure 7:
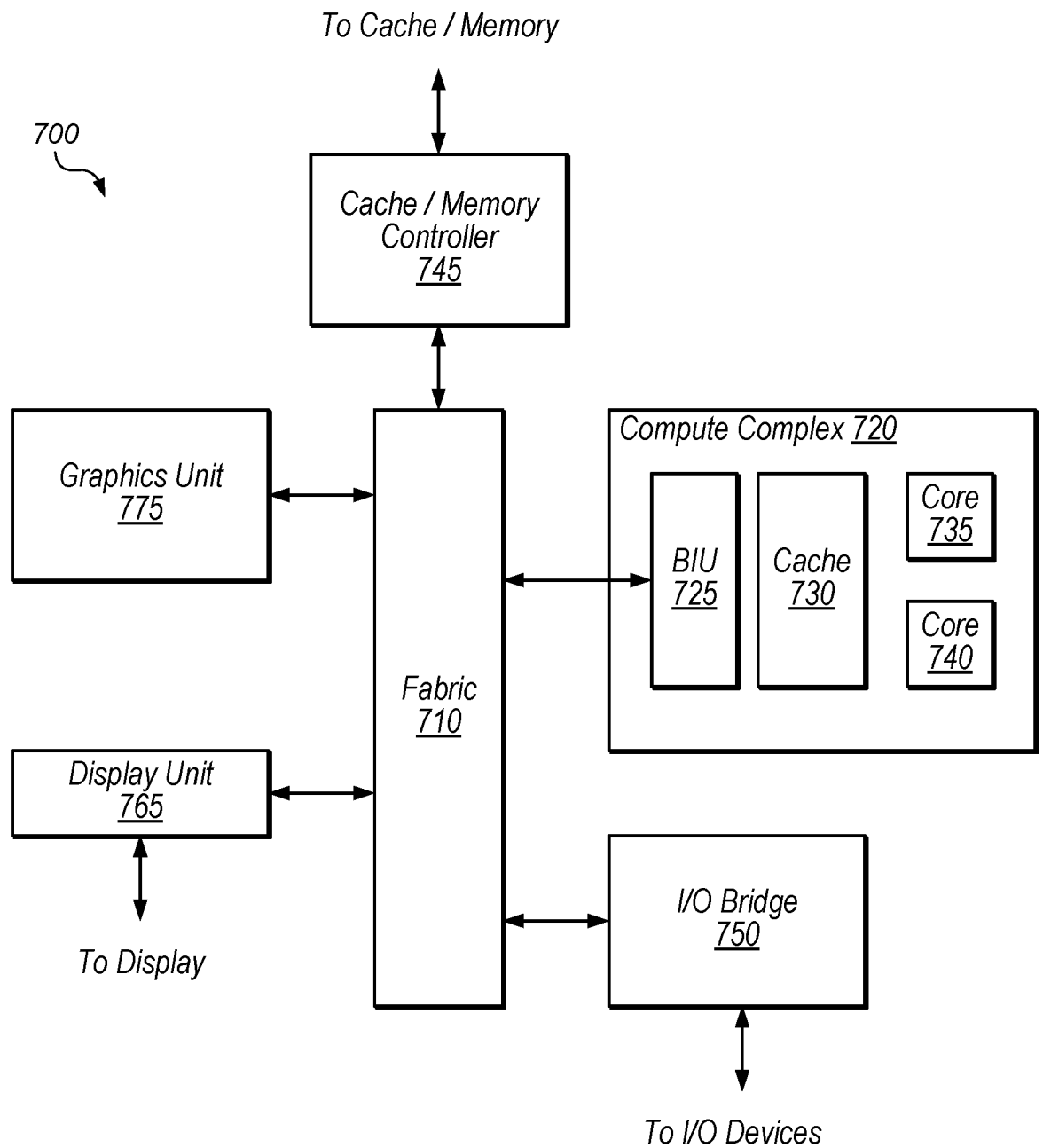
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720, input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

In some embodiments, signature prefetch circuitry 110 is included in one or more processor cores and may improve their performance relative to traditional prefetch techniques.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Graphics unit 775 may include one or more processors, e.g., one or more graphics processing units (GPU's). Graphics unit 775 may receive graphics-oriented instructions, such as OPENGL®, Metal, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

In some embodiments, signature prefetch circuitry 110 is included in graphics unit 775 and may improve its performance relative to traditional prefetch techniques.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 700 with connectivity to various types of other devices and networks.

Example Applications

Figure 8:
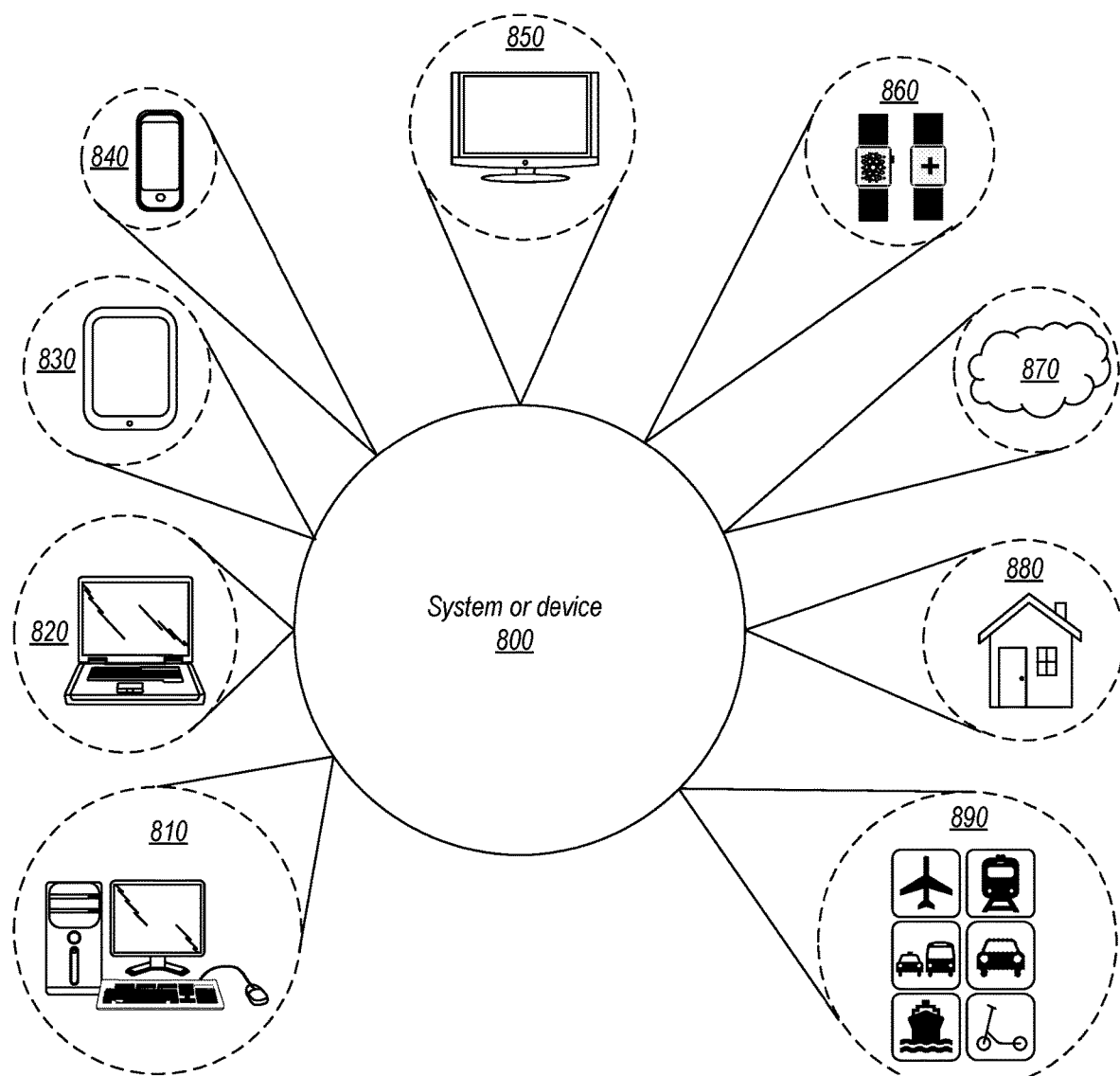
FIG. 8 is a diagram illustrating example applications of disclosed systems and devices, according to some embodiments.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9:
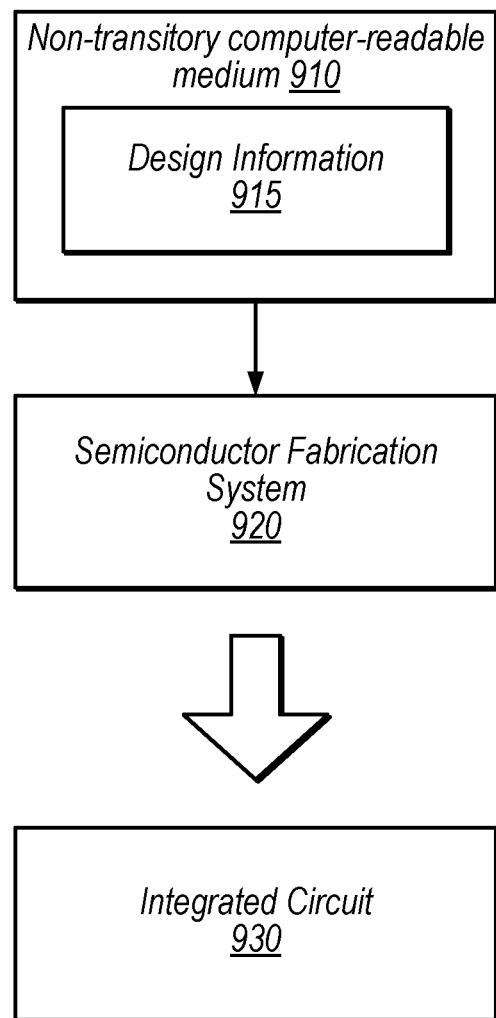
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis, layout, or both of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1-3, 5, and 7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   processor pipeline circuitry configured to execute a computer program that includes control transfer instructions, such that the execution follows a taken path through the computer program;
   first signature prefetch table circuitry that indicates prefetch addresses for signatures generated using a first signature generation technique;
   second signature prefetch table circuitry that indicates prefetch addresses for signatures generated using a second signature generation technique, wherein the first signature generation technique uses a type of control transfer instruction that specifies a different control transfer operation than any type of control transfer instruction used by the second signature generation technique; and
   signature prefetch circuitry configured to, in response to a prefetch training event:
      determine a first signature according to the first signature generation technique and a second signature according to the second signature generation technique; and
      select one but not both of the first and second signature prefetch table circuitry to train using the first signature or the second signature.

2. The apparatus of claim 1, wherein the signature prefetch circuitry is configured to generate current signatures during execution using the first and second signature generation techniques and is configured to prefetch data in response to a determination that a current signature matches an entry in one or both of the first signature prefetch table circuitry and the second signature prefetch table circuitry.

3. The apparatus of claim 2, wherein the prefetched data is a control transfer target.

4. The apparatus of claim 2, wherein the prefetched data is an instruction cache line.

5. The apparatus of claim 1, wherein the prefetch training event is a cache miss or a misprediction.

6. The apparatus of claim 1,
   wherein the first signature prefetch table circuitry is a default for training; and
   wherein the signature prefetch circuitry is configured to select the second signature prefetch table circuitry for training based on a determination that the first signature prefetch table circuitry already has an entry that matches the first signature.

7. The apparatus of claim 1, wherein the signature prefetch circuitry is configured to:
   suppress training of both the first and second signature prefetch table circuitry in response to a determination that an address associated with the prefetch training event is within a threshold range of a previous training address;
   suppress training of the first signature prefetch table circuitry in response to a determination that the first signature matches a threshold number of preceding training signatures generated using the first signature generation technique;
   suppress training of the second signature prefetch table circuitry in response to a determination that the second signature matches a threshold number of preceding training signatures generated using the second signature generation technique;

select the first signature prefetch table circuitry in response to a determination that training of the first signature prefetch table circuitry is not suppressed and that the first signature does not match a threshold number of entries in the first signature prefetch table circuitry; and select the second signature prefetch table circuitry in response to a determination that the first signature prefetch table circuitry is not selected and training of the second signature prefetch table circuitry is not suppressed.

8. The apparatus of claim 1, wherein the signature prefetch circuitry is configured to:

in response to detecting a merge candidate entry in the first signature prefetch table circuitry that matches the first signature and matches an address associated with the prefetch training event, modify the merge candidate entry based on the prefetch training event.

9. The apparatus of claim 1, wherein to train the selected table circuitry the signature prefetch circuitry is configured to allocate an entry with an address associated with the prefetch training event and the corresponding signature.

10. The apparatus of claim 1, wherein the first signature generation technique generates signatures based on program counters of taken branches; and wherein the second signature generation technique generates signatures based on call and return control transfer instructions.

11. The apparatus of claim 1, wherein the first and second signature generation techniques implement different prefetch lead times.

12. The apparatus of claim 1, wherein the first and second signature generation techniques use different lengths of taken path history.

13. The apparatus of claim 1, further comprising:

control circuitry configured to use a different replacement policy value for insertion, into a cache, of data that was prefetched by the signature prefetch circuitry than for other data.

14. A method, comprising:

executing, by a computing device, a computer program that includes control transfer instructions, such that the execution follows a taken path through the computer program;

storing, by the computing device in a first signature prefetch table, prefetch addresses for signatures generated using a first signature generation technique;

storing, by the computing device in a second signature prefetch table, prefetch addresses for signatures generated using a second signature generation technique, wherein the first signature generation technique uses a type of control transfer instruction that specifies a different control transfer operation than any type of control transfer instruction used by the second signature generation technique;

in response to a prefetch training event, the computing device:

determining a first signature according to the first signature generation technique and a second signature according to the second signature generation technique; and selecting one but not both of the first and second signature prefetch tables to train using the first signature or the second signature.

15. A non-transitory computer readable storage medium having stored thereon design information that specifies a design of at least a portion of a hardware integrated circuit in a format recognized by a semiconductor fabrication system that is configured to use the design information to produce the hardware integrated circuit according to the design, wherein the design information specifies that the hardware integrated circuit includes:

processor pipeline circuitry configured to execute a computer program that includes control transfer instructions, such that the execution follows a taken path through the computer program;

first signature prefetch table circuitry that indicates prefetch addresses for signatures generated using a first signature generation technique;

second signature prefetch table circuitry that indicates prefetch addresses for signatures generated using a second signature generation technique, wherein the first signature generation technique uses a type of control transfer instruction that specifies a different control transfer operation than any type of control transfer instruction used by the second signature generation technique; and signature prefetch circuitry configured to, in response to a prefetch training event:

determine a first signature according to the first signature generation technique and a second signature according to the second signature generation technique; and select one but not both of the first and second signature prefetch table circuitry to train using the first signature or the second signature.

16. The non-transitory computer readable storage medium of claim 15, wherein the first signature prefetch table circuitry is a default for training; and wherein the signature prefetch circuitry is configured to select the second signature prefetch table circuitry for training based on a determination that the first signature prefetch table circuitry already has an entry that matches the first signature.

17. The non-transitory computer readable storage medium of claim 15, wherein the signature prefetch circuitry is configured to:

suppress training of both the first and second signature prefetch table circuitry in response to a determination that an address associated with the prefetch training event is within a threshold range of a previous training address;

suppress training of the first signature prefetch table circuitry in response to a determination that the first signature matches a threshold number of preceding training signatures generated using the first signature generation technique;

suppress training of the second signature prefetch table circuitry in response to a determination that the second signature matches a threshold number of preceding training signatures generated using the second signature generation technique;

select the first signature prefetch table circuitry in response to a determination that training of the first signature prefetch table circuitry is not suppressed and that the first signature does not match a threshold number of entries in the first signature prefetch table circuitry; and select the second signature prefetch table circuitry in response to a determination that the first signature prefetch table circuitry is not selected and training of the second signature prefetch table circuitry is not suppressed.

18. The non-transitory computer readable storage medium of claim 15, wherein the signature prefetch circuitry is configured to:
   in response to detecting a merge candidate entry in the first signature prefetch table circuitry that matches the first signature and matches an address associated with the prefetch training event, modify the merge candidate entry based on the prefetch training event.

19. The non-transitory computer readable storage medium of claim 15, wherein the first and second signature generation techniques implement different prefetch lead times.

20. The non-transitory computer readable storage medium of claim 15, wherein the first and second signature generation techniques use different lengths of taken path history.

* * * * *